US007032813B2

(12) United States Patent
Mizuguchi

(10) Patent No.: US 7,032,813 B2
(45) Date of Patent: Apr. 25, 2006

(54) SECURITY TAG USING SECURITY SYSTEM AND OFFICE INSTRUMENT

(75) Inventor: Takahiro Mizuguchi, Tokyo (JP)

(73) Assignee: Ricoh Company, Ltd., (JP)

( * ) Notice: Subject to any disclaimer, the term of this patent is extended or adjusted under 35 U.S.C. 154(b) by 0 days.

(21) Appl. No.: 10/267,699

(22) Filed: Oct. 10, 2002

(65) Prior Publication Data

US 2003/0080181 A1 May 1, 2003

(30) Foreign Application Priority Data

Oct. 12, 2001 (JP) ............................ 2001-315245

(51) Int. Cl.
*G06F 17/00* (2006.01)

(52) U.S. Cl. ...................................... 235/375; 235/382

(58) Field of Classification Search ................ 235/375, 235/379, 381, 382; 715/500, 506; 705/50, 705/57; 713/168, 176

See application file for complete search history.

(56) References Cited

U.S. PATENT DOCUMENTS 4,550,246 A * 10/1985 Markman ................... 235/385
5,191,613 A * 3/1993 Graziano et al. ........... 713/176
5,490,217 A * 2/1996 Wang et al. .................. 380/51
5,506,697 A * 4/1996 Li et al. ..................... 358/448
5,633,932 A * 5/1997 Davis et al. ................ 713/176
5,671,282 A * 9/1997 Wolff et al. ................. 713/179
5,748,738 A * 5/1998 Bisbee et al. ............... 713/176
5,831,859 A * 11/1998 Medeiros et al. ........... 235/385
5,862,321 A * 1/1999 Lamming et al. ........... 709/200
5,974,548 A * 10/1999 Adams ....................... 713/200
5,978,477 A * 11/1999 Hull et al. .................. 358/403
5,982,506 A * 11/1999 Kara .......................... 358/405
5,982,956 A * 11/1999 Lahmi ........................ 382/306
6,052,547 A * 4/2000 Cuzzo et al. ................ 399/79
6,137,590 A * 10/2000 Mori ......................... 358/1.17
6,202,923 B1 * 3/2001 Boyer et al. ................ 235/375
6,289,460 B1 9/2001 Hajmiragha
6,367,693 B1 * 4/2002 Novogrod ................... 235/379
6,421,716 B1 * 7/2002 Eldridge et al. ............ 709/219
6,505,179 B1 * 1/2003 Kara ........................... 283/53
6,609,115 B1 * 8/2003 Mehring et al. .............. 705/51
6,751,732 B1 * 6/2004 Strobel et al. .............. 713/176

FOREIGN PATENT DOCUMENTS

EP 0 907 120 A2 4/1999

* cited by examiner

*Primary Examiner*—Ahshik Kim
(74) *Attorney, Agent, or Firm*—Dickstein Shapiro Morin & Oshinsky LLP

(57) ABSTRACT

One or more office instruments FM1 to FMn attaches a tag Tg to sheet and image data documents when a document is to be processed, and transmits the document image data to a security administrative server together with the security tag Tg to be stored there. The security administrative server compares incoming image data and security tag Tg with those already stored in a security file, and transmits a comparison result to the applicable office instruments FM1 to FMn. The applicable office instruments FM1 to FMn then either allow or reject document image data processing based on the comparison result.

11 Claims, 4 Drawing Sheets

USER SUPERVISORY TABLE

ACCOUNTING TABLE

SECURITY TAG USING SECURITY SYSTEM AND OFFICE INSTRUMENT

CROSS REFERENCE TO RELATED APPLICATION

This application claims priority under 35 U.S.C. § 119 to Japanese Patent Application No. 2001-315245 filed on Oct. 12, 2001, the entire contents of which are herein incorporated by reference

BACKGROUND OF THE INVENTION

1. Field of the Invention

This invention relates to an office instrument and security system, more particularly, to an office instrument capable of attaching a security tag to documents obtained by printing, copying, scanning and the like, and to a security system capable of managing security of the document handled by the office instrument.

2. Discussion of the Background Art

In conventional office instruments, such as facsimiles, copiers, and printers, security is independently managed per instrument. Conventional office instruments protect against violation of security by necessitating a separate input of a password or similar so as to limit a user or admit usage.

However, some improvement is still required in such a conventional technique in order to improve security of a document. Further, a modern office instrument is increasingly networked and commonly utilized by a plurality of users while connected to a computer. In such an environment, individual security managed per instrument generally causes difficulties once an electronic document is output as a sheet document. Thus, in order to manage security appropriately the security should be within an electronic document.

SUMMARY OF THE INVENTION

Accordingly, an objective of the present invention is to address and resolve the above-noted and other problems and to provide a new security system. These objectives are achieved according to the present invention by providing a novel security system whereby an office instrument is connected to a network and attaches a security tag to a document. Specifically, security is administered by attaching a security tag to a sheet document output from the office instrument, or image data document input by the scanner, when the document is printed, copied, and scanned. Security is further managed by tracking the document image in order to prohibit an office instrument from printing and copying the document if it has already been given a security tag by a security administrator.

In another embodiment, the security administrative server, the user terminals and all of the office instruments, including printers, copiers, and scanners that handle secure documents are connected to the network. The office instrument attaches a security tag describing various document processing conditions to sheet and image data documents that is processed later as security data.

The office instrument transmits data of these sheet and image data documents with security tags to the administrative server for the security check when the sheet and image data documents are to be processed. The security administrative server stores the sheet and image data documents together with their respective security tags in its memory. The security administrative server compares incoming document image data and attached security tags with the document image and security data already stored in the memory. The security administrative server then transmits the comparison result to the office instrument and tracks the document image data possibly processed therein. The office instrument then either allows or rejects document image data processing in accordance with the comparison result. Further security of the document data can be obtained in cooperation with other office instruments, such as a copier.

In a further embodiment, the security administrative server stores compressed image data of a document in the memory. In this respect, the office instrument compresses and transmits the document image data, which will be processed later, to the security administrative server so as to improve the security system. As a result, capacity of the memory can be increased, and the time required to transmit the image data can be shortened.

In yet another embodiment, the security administrative server stores an accounting table in the memory and gives an accounting of document image data handled in the office instrument. Thus, accounting information, such as a number of documents handled in the office instrument, usage value of copying, faxing, and printing, can be stored in the security administrative server.

An additional embodiment of the present invention is that the security administrative server manages both document image and security data in relationship with the user ID of a user terminal, so that both security administration and accounting can be handled relative to a particular user ID. Accordingly, the security can be administrated per user.

BRIEF DESCRIPTION OF DRAWINGS

A more complete appreciation of the present invention and many of the attendant advantages thereof will be readily obtained by reference to the following detailed description when considered in connection with the accompanying drawings, wherein.

DETAILED DESCRIPTION OF PREFERRED EMBODIMENTS

Figure 1:
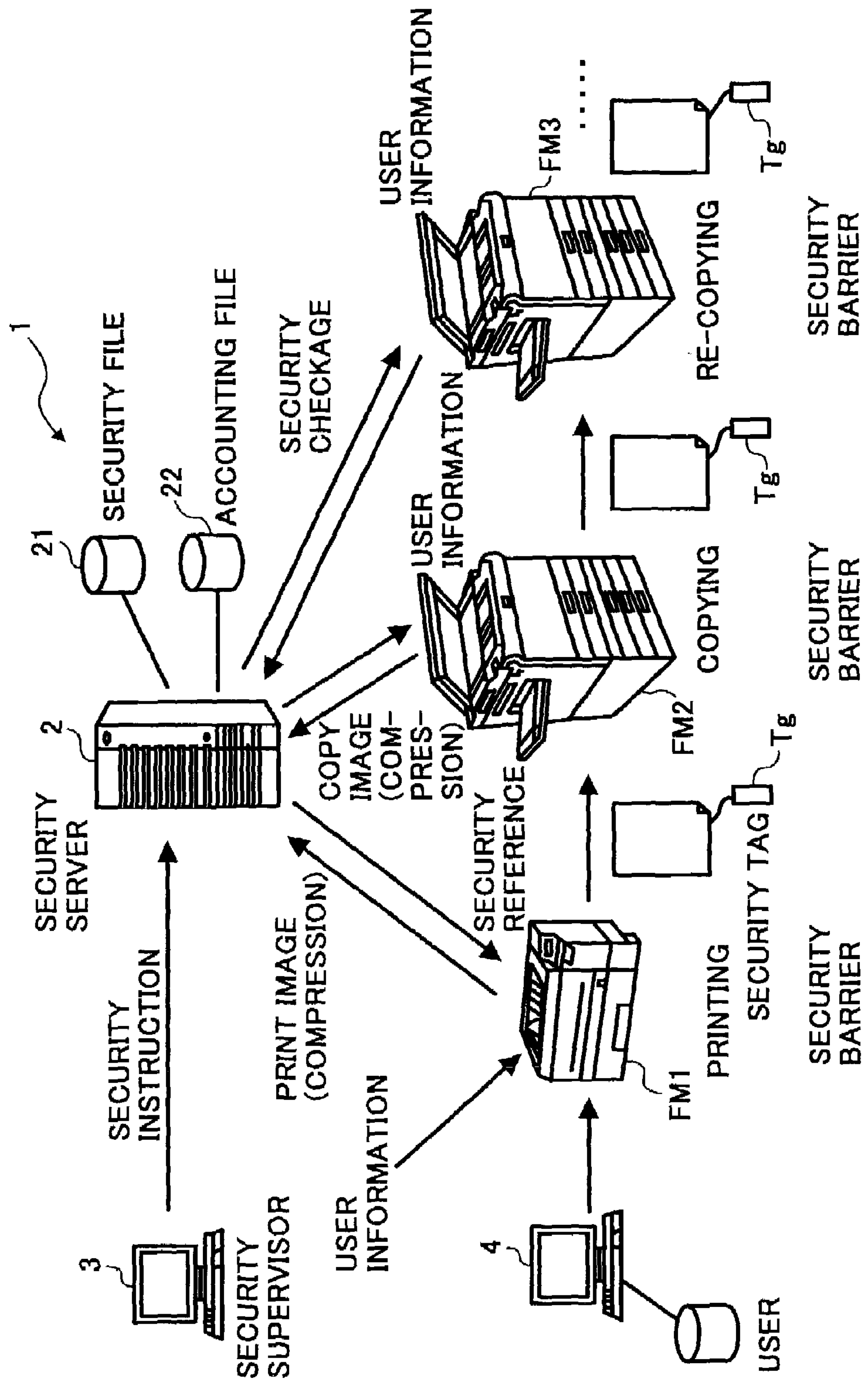
FIG. 1 is a system configuration chart illustrating a security system that adopts one embodiment of an office instrument and security system according to the present invention.

In the drawings, like reference numerals and marks designate identical or corresponding parts throughout several views. FIGS. 1 to 6, illustrate one embodiment of a security system according to the present invention. Specifically, FIG. 1 illustrates a construction of security system 1 as one embodiment of the present invention.

As shown in FIG. 1, a security administrative server 2, a security administrator use terminal 3, a plurality of office instruments FM1 to FMn, and a user terminal 4 may be connected to a network in the security system 1. The security system 1 may perform a security function and perform security accounting.

The security administrator use terminal 3 may be a security administrator use client and an information processing apparatus, such as a personal computer or similar, having a display. The security administrator use terminal 3 may access the security administrative server 2 and display security authority (i.e., usage permission) and accounting information or the like per a user on the display in order to confirm permission to use. Specifically, the security administrator use terminal 3 may perform maintenance of the user administrative table by designating and registering a security authority.

The security administrative server 2 may function as a network server while managing the security. The security administrative server 2 may store both a security file 21 and an accounting file 22 in a large capacity memory or similar. The security administrative server 2 may manage security administrative data in response to instruction from the security administrator use terminal 3. The security administrative server 2 may manage security by storing both image information of a document and its tag information transmitted from office instruments FM1 to FMn. The security administrative server may then compare incoming image information of a document and its tag information with information already stored.

Figure 2:
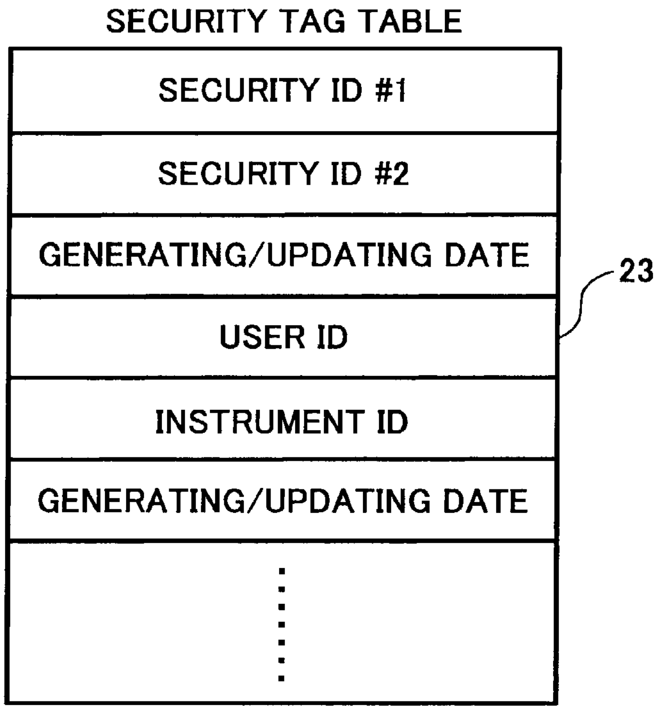
FIG. 2 is a chart illustrating one example of a security tag table stored in a security file of a security administrative server of FIG. 1.
Figure 3:
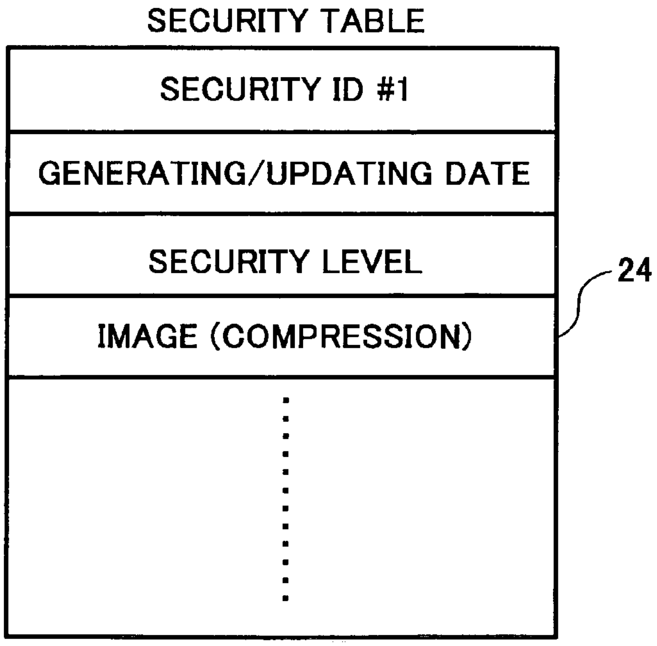
FIG. 3 is a chart illustrating one example of a security table stored in the security file.
Figure 4:
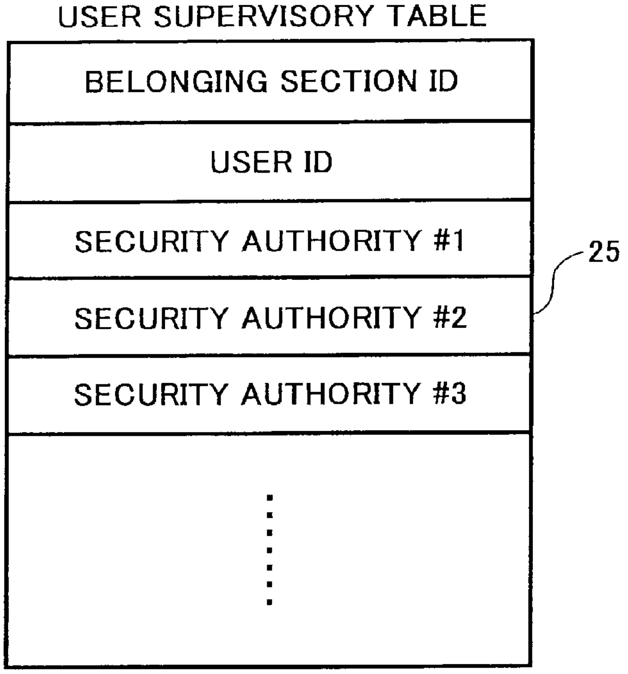
FIG. 4 is a chart illustrating one example of a user administrative table stored in the security file.
Figure 5:
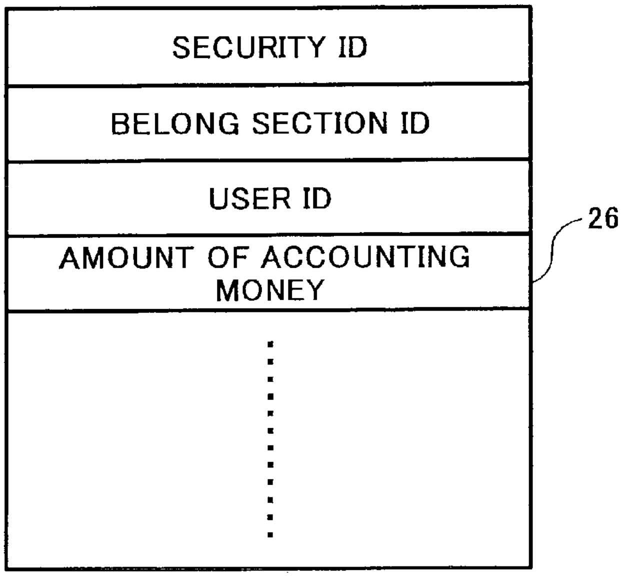
FIG. 5 is a chart illustrating one example of an accounting table stored in a accounting file of the security administrative server of FIG. 1.

The security file 21 includes, as illustrated in FIGS. 2 to 4, a security tag table 23, a security table 24, and a user administrative table 25. Specifically, the types of security identification (ID) may include generated/updated date, user ID, instrument ID, and generated/updated contents and may be registered in the security tag table 23 of FIG. 2. All of the security ID information including generated/updated date, security level, and compressed document images may be registered in the security table 24 of FIG. 3. All of the information including section ID, user ID, and a plurality of security authorities or similar may be registered with the user administrative table 26 of FIG. 4.

Further, the accounting file 22 may include the accounting table 26, where security ID, section ID, user ID and accounting information, or the like may be registered. The user terminal 4 may be a user client 7, and is an instrument, such as a personal computer having a display, and gives various instructions such as outputting to the office instruments FM1 to FMn.

The respective office instruments FM1 to FMn may each include a security barrier function, and respectively include a printer FM1, a copier FM2, and a facsimile FM3, or the like. Each of the office instruments FM1 to FMn may perform functions such as attaching a security tag to a document as a security barrier, and communicating all of the printing, copying, and image information to the security administrative server 2.

An operation of the embodiment is now described. According to security system 1 of this embodiment when a user authority, a function (e.g. accounting) of security administrative server 2, and a function (e.g. copying, printing, and scanning) of each office instrument FM1 to FMn are designated and input from the security administrator use terminal 3, the security administrative server 2 may store the user authority in a security authority field of the user administrative table 25.

Thus, when one of the office instruments FM1 to FMn, FM1 as a printer for example, is instructed to output by the user terminal 4, the office instrument FM1 may compress and transmit the printing image (i.e., a document image) to the security administrative server 2. The security administrative server 2 may retrieve the same image data from the security table 24 and determine if the same image has been already registered. If the same image data has been already registered, the security administrative server 2 may return prescribed certified data for the document image with an instruction stored in a security level field such as inhibition, permission, or as security.

At the same time, the office instrument FM1 may obtain user certification information such as key input, magnetic card, IC card, or fingerprint, and transmit it to the security administrative server 2. The security administrative server 2 may refer to the user administrative table 25, and transmit prescribed user certified data to the office instrument FM1, when it determines that the user is allowable.

When certified as an authorized output instruction from the allowable user, the office instrument FM1 may perform printing for the first time. If it is not authorized, the office instrument FM1 may perform a rejection process such as alarming, operation stoppage, or reporting.

Further, when a printed document without a security tag Tg is copied on one of the office instruments FM1 to FMn, such as FM2, the office instrument FM 2 may put a security tag Tg on a copy of the document. When a document printed by one of the office instruments FM1 to FMn is given a security tag and is either copied by the office instrument FM2, or copied again by the office instrument FM3 or the like, information of the security tag Tg attached to the document may be updated.

The tag information may be recorded on an outputted sheet document either by printing a prescribed code or pattern, or embedding a prescribed magnetic fiber or stripe and electronic record, such as an IC card, in the sheet document. The tag information may simultaneously be transmitted to the security administrative server 2 from applicable office instruments FM1 to FMn, and then registered on the security tag table 23 by the security administrative server 2.

Figure 6:
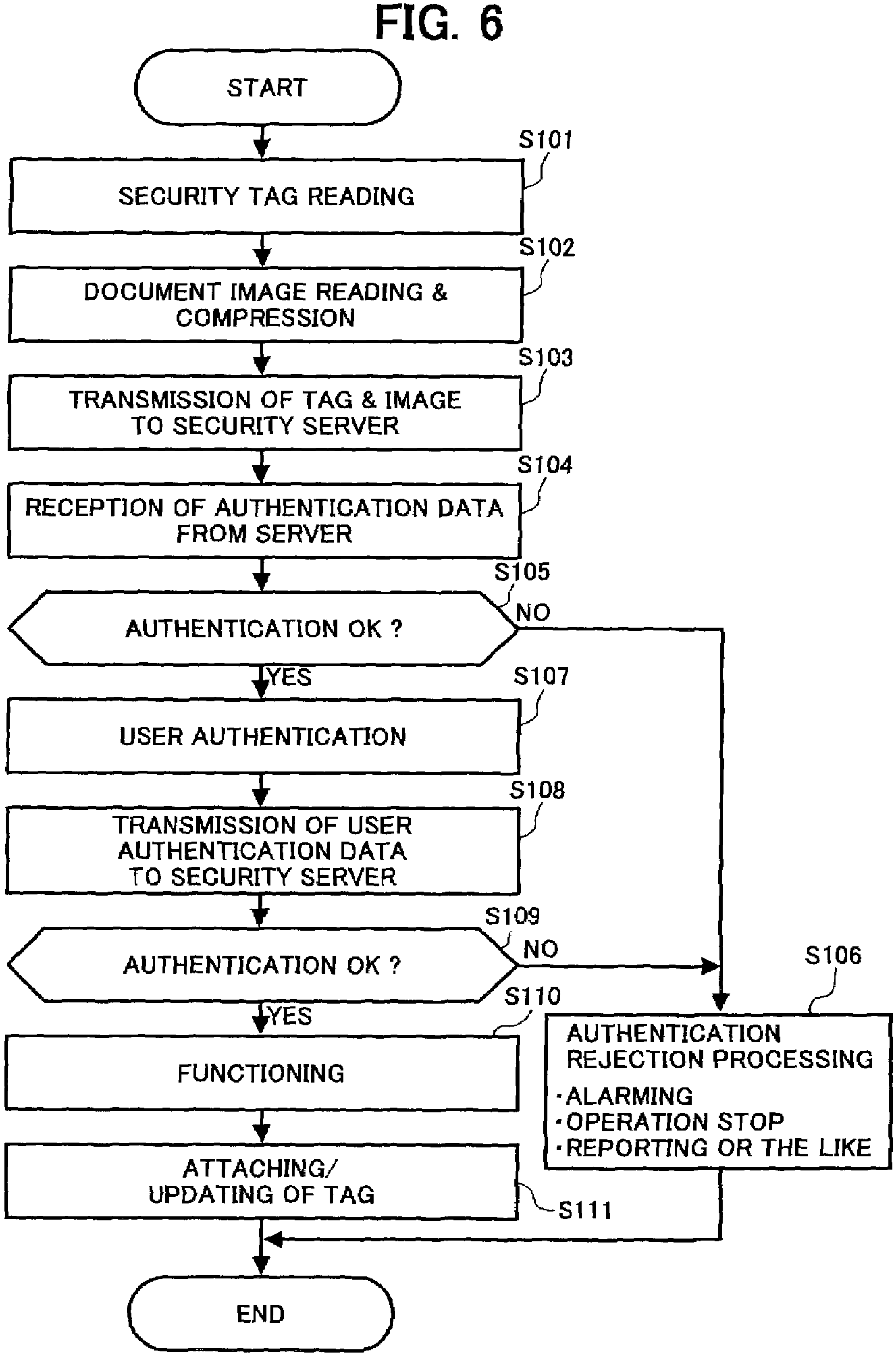
FIG. 6 is a flowchart illustrating a security administration performed by the office instrument of FIG. 1.

An operation of the office instruments FM1 to FMn is now described in more detail with reference to FIG. 6. When receiving an instruction of document output, the applicable office instruments FM1 to FMn may read a security tag Tg of the document (in step S101) as illustrated in FIG. 6. Then, the office instruments FM1 to FMn may read and compress a document image (in step S102), and transmit the security tag Tg read together with the compressed image to the security administrative server 2 (in step S103)

When prescribed certified data is transmitted from the security administrative server 2, the office instruments FM1 to FMn may receive the certified data (in step S104), and examine if the certification is positive (in step S105). If it is negative, the office instruments FM1 to FMn may each perform a certification rejection process, such as alarming, operation stoppage or reporting, thereby completing the process (in step S106).

In contrast, if the certification is positive (in step S105), the office instruments FM1 to FMn may obtain user certification information (in step S107) from key input, magnetic card, IC card, hand mark, fingerprint or similar, and transmit it to the security administrative server 2. The office instruments FM1 to FMn may examine if the certification result returned from the security administrative server 2 is positive (in step S109). If the certification result is negative, the office instruments FM1 to FMn may perform the above-described certification rejection process (in step S106).

If the certification result is positive, the office instruments FM1 to FMn may perform the requested function (in step S110), and attach a security tag Tg or update information included in an already attached security tag Tg. Thereby, the security process may be terminated (in step S111).

The security system 1 may store the entire document image data processed and handled by the office instruments FM1 to FMn in the accounting table of the security administrative server 2, and give an accounting of the entire document image data. An accounting data processing method therefore may be executed by the security administrative server 2 upon receiving an instruction from the security administrator use terminal 4. Accounting methods on various user data such as metered rates in accordance with past usage record, data quantity, outputs, or copied pages may be applied.

Thus, office instruments FM1 to FMn of the security system 1 of this embodiment may attach a security tag Tg to a processing objective sheet and image data documents so as to manage security when performing document printing, scanning, and copying or the like.

Accordingly, a security operation can be performed by attaching a security tag Tg to a document either first output from the office instrument or input by the scanner. Further, a security operation can be performed by tracking document image data in order to prohibit an office instrument from printing or copying, in accordance with the setting of the security administrator, if the document has already been given the security tag Tg. Thus, the security of data of a document including a sheet document can be managed in cooperation with other office instruments FM1 to FMn using a security tag Tg, for example, when a document once output is to be copied.

The security administrative server 2 may store both image data of a document and security data in a large capacity memory so as to manage security in this embodiment of the security system 1. The office instruments FM1 to FMn may also attach a security tag Tg to processing objective sheets and image data documents, and transmit the security tag Tg and image data to the security administrative server 2. The security administrative server 2 may refer and compare image data and security tag Tg stored in the large capacity memory with incoming image data and security data, and transmit the comparison result to applicable office instruments FM1 to FMn. Simultaneously, the security administrative server 2 tracks document image data possibly processed by the applicable office instruments FM1 to FMn. The office instruments FM1 to FMn may allow or reject document image data processing based on the comparison result.

Security can be managed by storing image data of a document processed in the office instruments FM1 to FMn together with its security tag Tg in the security administrative server 2. Thus, the security of document data, including sheet document data, can be managed in cooperation with other office instruments FM1 to FMn using a security tag Tg, when a document once output is to be copied, for example.

In the security system 1 of this embodiment, the security administrative server 2 may store compressed image data of a document in a large capacity memory. In this embodiment, the applicable office instruments FM1 to FMn compress and transmit image data of the document to be processed to the security administrative server 2. Accordingly, besides security of a document, availability of a network can be improved while increasing capacity of a large capacity memory and shortening the time required for document data transmission via a network.

As described earlier, according to the security system 1 of this embodiment, the security administrative server 2 may store an accounting table 26 in the large capacity memory, and give an accounting of document data processed by the office instruments FM1 to FMn in accordance with the accounting table 26.

As a result, accounting of security processing may be realized in a number of ways, and management of the security system may be performed by the security administrative server 2 while storing accounting information, such as a number of processed documents or a usage value of a function for example.

According to the security system 1 of this embodiment, the security administrative server 2 may manage both document image and security data by connecting these data with the user ID of a user terminal, managing security while giving an accounting based upon the user ID. Accordingly, security can be managed per a user while properly performing both security administration and accounting.

The mechanisms and processes set forth in the present invention may be implemented using one or more conventional general purpose microprocessors and/or signal processors programmed according to the teachings in the present specification as will be appreciated by those skilled in the relevant arts. Appropriate software coding can readily be prepared by skilled programmers based on the teachings of the present disclosure, as will also be apparent to those skilled in the relevant arts. However, as will be readily apparent to those skilled in the art, the present invention also may be implemented by the preparation of application-specific integrated circuits by interconnecting an appropriate network of conventional component circuits or by a combination thereof with one or more conventional general purpose microprocessors and/or signal processors programmed accordingly. The present invention thus also includes a computer-based product which may be hosted on a storage medium and include, but is not limited to, any type of disk including floppy disks, optical disks, CD-ROMs, magnet-optical disks, ROMs, RAMs, EPROMs, EEPROMs, flash memory, magnetic or optical cards, or any type of media suitable for storing electronic instructions.

Obviously, numerous additional modifications and variations of the present invention are possible in light of the above teachings. It is therefore to be understood that within the scope of the appended claims, the present invention may be practiced otherwise than as specifically described herein.

What is claimed as new and desired to be protected by Letters Patent of the United States is:

1. A security system, comprising:

an administrative server connected to a network and operative to administrate the network;

an office instrument connected to the network and operative to perform at least one of printing, scanning, and copying, the office instrument being arranged and configured to attach a security tag to such a printed, scanned, or copied document, the security tag having security data unique to the document, and to transmit image data of the document together with the attached security tag to the administrative server; and a user terminal connected to the network and arranged to instruct the office instrument to perform one of the printing, scanning and copying;

wherein the administrative server is arranged and configured to store image data for various security required documents and corresponding attached security tags in a memory, to compare incoming document image data and security tags collectively transmitted from the office instrument with the various document image data and corresponding security tags stored in the memory to obtain a comparison result, and transmit the comparison result to the office instrument, and wherein the office instrument is arranged and configured to receive the comparison result and determine whether to allow or reject a subsequent one of the printing, scanning and copying of a respective document in accordance with the comparison result.

2. The security system according to claim 1, wherein the security tag includes at least a user or instrument ID.

3. The security system according to claim 2, wherein the security tag further includes a tag generation date and usage information of a respective one of the printing, scanning and copying.

4. The security system according to claim 3, wherein the usage information of the security tag is updated when a document having the security tag is processed by at least one of the printing, scanning and copying.

5. The security system according to claim 4, wherein the updated usage information of the security tag is transmitted from the office instrument to the security server to be stored.

6. The security system according to claim 5, wherein the office instrument is arranged and configured such that when the comparison result is negative, the office instrument performs at least one of transmitting an alarm signal and stopping operation of the office instrument.

7. The security system according to claim 2, wherein the comparison result is positive if the same user ID and image data are stored in the memory and negative if the same user ID and image data are not stored in the memory.

8. The security system according to claim 7, wherein when the comparison result is negative, the office instrument performs at least one of transmitting an alarm signal and stopping operation of the office instrument.

9. The security system according to claim 1, wherein a respective document transmitted to the administrative server is compressed for storage.

10. The security system according to claim 1, wherein the administrative server stores an accounting table in the memory, and gives an accounting of the image data documents processed by the office instrument in accordance with the updated usage information with reference to the accounting table.

11. A security system, comprising:

an administrative server connected to a network and operative to administer the network;

an office instrument connected to the network and operative to perform a document operation including at least one of printing, scanning, and copying, the office instrument being arranged and configured during a first document operation to attach to a document a security tag unique to the document and to transmit image data of the document together with the attached security tag to the administrative server; and a user terminal connected to the network and arranged to instruct the office instrument to conduct document operations including at least one of the printing, scanning and copying;

wherein the administrative server is arranged and configured to store the image data of the document and the attached security data, to compare document image data and security tags collectively received by the administrative server against the document image data and the security tag to obtain a comparison result, and transmit the comparison result to the office instrument; and wherein the office instrument is arranged and configured to receive the comparison result and determine in accordance with the comparison result whether to allow or reject a second document operation including at least one of printing, scanning and copying of the document requested by a user terminal.

* * * * *